(12) United States Patent
Miao et al.

(10) Patent No.: US 8,660,692 B2
(45) Date of Patent: Feb. 25, 2014

(54) CURRENT ALTERNATING ROBOT SYSTEM AND METHOD OF ELECTRIC BUS

(75) Inventors: Peiqing Miao, JiNan (CN); Bingqiang Li, JiNan (CN); Tongbin Wang, JiNan (CN); Lin Tan, JiNan (CN); Jinlong Zhao, JiNan (CN); Tongzhi Li, ShanDong Province (CN); Liangmin Yu, ShanDong Province (CN); Jun Du, ShanDong Province (CN); Jinxing Wang, ShanDong Province (CN); Chuanqing Wang, ShanDong Province (CN); Hongmei Li, ShanDong Province (CN); Jidong Liu, ShanDong Province (CN); Yan Zhao, ShanDong Province (CN); Shiyou Mu, ShanDong Province (CN); Yutian Sun, ShanDong Province (CN); Guanbin Wu, ShanDong Province (CN); Yuming Gao, ShanDong Province (CN); Huadong Zhang, ShanDong Province (CN); Naiyuan Xu, ShanDong Province (CN); Yong Sun, ShanDong Province (CN)

(73) Assignees: State Grid Corporation of China, Beijing (CN); State Grid Shandong Province Electric Power Company, Jinan (CN); Electric Power Research Institute of State Grid Shandong Electric Power Company, Jinan (CN); ShanDong LuNeng Intelligence Technology Co., Ltd., Jinan (CN)

( * ) Notice: Subject to any disclaimer, the term of this patent is extended or adjusted under 35 U.S.C. 154(b) by 0 days.

(21) Appl. No.: 13/877,076

(22) PCT Filed: Apr. 16, 2012

(86) PCT No.: PCT/CN2012/000518
§ 371 (c)(1),
(2), (4) Date: Mar. 29, 2013

(87) PCT Pub. No.: WO2013/071682
PCT Pub. Date: May 23, 2013

(65) Prior Publication Data
US 2013/0218333 A1    Aug. 22, 2013

(30) Foreign Application Priority Data

Nov. 18, 2011 (CN) .......................... 2011 1 0368931
Nov. 18, 2011 (CN) ...................... 2011 2 0458959 U

(51) Int. Cl.
*G06F 19/00* (2011.01)

(52) U.S. Cl.
USPC .................. 700/245; 701/22; 901/1; 901/16; 180/65.1; 180/68.5; 320/108; 320/109; 414/222.01; 414/467

(58) Field of Classification Search
USPC ........ 700/245–265; 414/222.01–222.13, 467, 414/560; 901/1, 16; 701/22; 180/65.1, 68.5; 320/108, 109, 115
See application file for complete search history.

(56) References Cited

U.S. PATENT DOCUMENTS

| | | | | |
|---|---|---|---|---|
| 5,545,967 | A * | 8/1996 | Osborne et al. | 320/109 |
| 6,094,028 | A * | 7/2000 | Gu et al. | 320/109 |
| 7,258,184 | B2 | 8/2007 | Shorney et al. | |
| 7,993,155 | B2 * | 8/2011 | Heichal et al. | 439/374 |
| 8,146,694 | B2 * | 4/2012 | Hamidi | 180/68.5 |
| 8,164,300 | B2 * | 4/2012 | Agassi et al. | 320/104 |
| 8,454,377 | B2 * | 6/2013 | Heichal et al. | 439/247 |
| 2005/0121241 | A1 | 6/2005 | Shorney et al. | |
| 2008/0258682 | A1 * | 10/2008 | Li | 320/109 |
| 2010/0071979 | A1 * | 3/2010 | Heichal et al. | 180/68.5 |
| 2010/0141206 | A1 * | 6/2010 | Agassi et al. | 320/109 |
| 2010/0181129 | A1 * | 7/2010 | Hamidi | 180/68.5 |
| 2011/0297470 | A1 * | 12/2011 | Heichal et al. | 180/68.5 |
| 2012/0217077 | A1 * | 8/2012 | Ojima et al. | 180/68.5 |
| 2012/0306445 | A1 * | 12/2012 | Park et al. | 320/109 |

FOREIGN PATENT DOCUMENTS

| CN | 1261319 C | 6/2006 |
|---|---|---|
| CN | 201136484 Y | 10/2008 |
| CN | 201881868 U | 6/2011 |
| CN | 102275573 A | 12/2011 |
| CN | 102490694 A | 6/2012 |
| CN | 102180143 A | 1/2013 |

OTHER PUBLICATIONS

Aug. 30, 2012 Written Opinion of the International Searching Authority issued in International Patent Application No. PCT/CN2012/000518 (w/ English Translation).

Apr. 16, 2012 International Search Report issued in International Patent Application No. PCT/CN2012/000518.

\* cited by examiner

*Primary Examiner* — Khoi Tran
*Assistant Examiner* — Rachid Bendidi
(74) *Attorney, Agent, or Firm* — Oliff & Berridge, PLC

(57) ABSTRACT

The system includes a robot body and a main robot control platform. The robot body includes a mechanical part and an electrical control part. The mechanical part includes a horizontal moving unit, an objective carrying platform unit and a bearing unit which are arranged in X, Y and Z cartesian coordinate directions. The objective carrying platform unit includes an objective carrying platform and a battery drive mechanism arranged on the objective carrying platform. A battery pushing mechanism is arranged on the battery drive mechanism. The electrical control part includes a data collection device connected with a main control computer system, a power drive mechanism, an I/O model and a wireless communication model I. The wireless communication model I, the wireless communication model II of a control backend and the wireless communication model III in the remote control device wirelessly communicate with each other.

6 Claims, 5 Drawing Sheets

CURRENT ALTERNATING ROBOT SYSTEM AND METHOD OF ELECTRIC BUS

TECHNICAL FIELD

The invention relates to a current alternating system of batteries between an electric vehicle and a battery transit table and a current alternating method, in particular to a current alternating robot system and a current alternating method of an electric bus.

BACKGROUND ART

For solving the problems of alleviating the shortage of petroleum resources and reducing the environmental pollution from automotive fuel, the development of new energy vehicles becomes the development trend of automobile industry in the future as the double pressure of resources and environment continuously increases. At present, low-emission vehicles (hybrid electric vehicles) enter the large-scale industrialization stage and over 1,000,000 vehicles had sold in the world; and the batch production time of low-emission vehicles (blade electric vehicles) has been advanced to 2015, which is earlier than 10 years to 15 years in advance comparing with originally expected time.

But in practical application, because of limitation of energy density of present batteries, the duration mileage of the electric vehicles is between 100 kilometers and 200 kilometers, and the duration mileage is much shorter than the duration mileage of traditional vehicles. So whether the energy is quickly supplied to the vehicles directly influences popularization and application of the electric vehicles. In general, slow-speed charge of the batteries takes several hours to complete, so the quick-speed charge influences the service life of the batteries; and the batteries in single boxes are incontinent to manually change because of heavy weight.

For the electric bus, on one hand, the electric bus needs larger battery capacity; on the other hand, because of the limitation of the capacity of the batteries in the signal boxes, combination of multiple battery boxes is adopted to supply the electric energy; because of the number increase of the batteries, occupy space is large; and because the dead load of the vehicle is increased, the weight of the battery of the electric bus reaches tons. According to the current situations of the present battery capacity, a group of the batteries are changed after operated for most 4 hours, and six to eight batteries are changed in each time. The time for manually changing the batteries is at least one to two hours, which is not allowed for operators.

At present, relevant domestic enterprises and institutions have some experiences of research in the battery change system of the electric bus. On Sep. 30, 2010, State Intellectual Property Office of the People's Republic of China discloses a utility model of which publication number is 201881868U and application number is 201020561469.X. The utility model provides a battery change device and a current alternating system of an electric commercial vehicle. Firstly, the system provides a battery change scheme of the electric bus; the scheme provides a method for rotating for 180 degrees by using a current alternating mechanism to solve the consistency problem of the battery connectors between an objective table and the direction of the vehicle body, but the system has the shortcomings that the free degrees are needed most, the control system is complex, the work space is large and the error rings are more.

In addition, performances and economical efficiency of the electric vehicles are close or even better than that of traditional petroleum-fueled vehicles as the technology improves, and the electric vehicles are gradually popularized and applied in the world. Beijing Dianba Company begins to reach and develop the current alternating system of the bus in 2005 at home, and realizes the large-scale pilot operation of the current alternating buses. While the electric vehicles are popularized, the energy storage and supply systems of the electric vehicles become the technical keys of the development of the electric vehicle industry.

The fast current alternating mechanical arm of the current electric vehicle, such as 'Positioning device for vehicle battery change system' in patent 200820078476.7 and 'Electric bus system' in patent 200410090796.0, discloses a powered vehicle which adopts vehicle power battery as power source and discloses the relative technologies, but the disclosed device has the following shortcomings: multi-positioning operation is needed during the process of changing the batteries; the time for changing the batteries is long; the space for changing equipment is large, which goes against the layout; and during the process of changing the batteries, because the batteries are rotated for 180 degrees, the working space for changing the batteries is increased.

For the electric bus, on one hand, the electric bus needs larger battery capacity; on the other hand, because of the limitation of the capacity of the batteries in the signal boxes, combination of multiple battery boxes is adopted to supply the electric energy; because of the number increase of the batteries, occupy space is large, even the weight of the battery of the electric bus reaches tons. The volume and the weight of the current alternating robot are large, so the large robot motion needs drive components with large power; and the drive current is large, so it is very dangerous while closing to the robot.

The main control cabinet and the electrical control cabinet of the current robot adopt the integrated design, and operators directly stand by the electrical control cabinet to operate, so the personal safety of the operators is threatened.

So in principle, the main control table of the robot are demanded to be installed outside the moving range of the robot, simultaneously the robot shall has the characteristics that the operation is simple and the operators can operate the robot after simply trained.

There is a distance between the control platform of the current fast current alternating robot and the fast current alternating robot at the same time. When the positioning and moving operations in small range are demanded, if the fixed control platform is simply adopted, there are the shortcomings, such that the volume is large, the moving speed is slow, and the range of the free degree is small. During the process of changing the batteries, the characteristics of high positioning precision, small relative displacement and accuracy position are demanded, so the control is difficult.

CONTENTS OF INVENTION

The purpose of the invention is to provide a current alternating robot system and a current alternating method of an electric bus for solving the problems. The invention quickly changes the power batteries of the electric bus, rationally uses the land sources, reduces the space occupied by the current alternating system of the power batteries, seals the storage area of the power batteries and improves the service life of the power batteries; and the invention further automatically positions the states of the batteries and adjusts the gestures so as to realize the functions of grabbing and installing the batteries.

For realizing the purpose, the invention adopts the following technical scheme:

The current alternating robot system of the electric bus comprises a robot body and a main robot control platform. The robot body comprises a mechanical part and an electrical control part. The mechanical part comprises a horizontal moving unit, an objective carrying platform unit and a bearing unit which are arranged in X, Y and Z cartesian coordinate directions. The bearing unit is arranged on the upper part of the horizontal moving unit, and the objective carrying platform unit is connected with the bearing unit. The objective carrying platform unit comprises an objective carrying platform and a battery drive mechanism arranged on the objective carrying platform. A battery pushing mechanism is arranged on the battery drive mechanism.

The electrical control part comprises a data collection device connected with a main control computer system, a power drive mechanism, an I/O model and a wireless communication model I. The power drive mechanism is connected with the horizontal moving unit and the bearing unit in the mechanical part and a transmission device in the objective carrying platform.

The main control platform of the robot establishes the wireless communication with the wireless communication model I of the robot body through a wireless communication model II.

The bearing unit comprises a gate structure which consists of an upper cross beam, a lower cross beam and two vertical columns. Two groups of horizontal guide wheels are arranged on the upper cross beam; and a sky rail which is installed on a charge rack is held between the two groups of the horizontal guide wheels. A slide-touch wire channel through which equipment gets electricity and a horizontal addressing chip for addressing the working positions in horizontal direction are installed on the sky rail. Winches driven by at least one group of motors are arranged on the two vertical columns. Steel wire ropes are wound on the winches, and the lower ends of the steel wire ropes are connected on the objective carrying platform unit. A longitudinal addressing chip for addressing in vertical direction is arranged on at least one vertical column.

The horizontal moving unit comprises a roller and a follow-up roller of which two sides are provided with rims, and a ground rack which is connected with the lower cross beam of the bearing unit. The end part of the ground rack is provided with a limiting collision block. The roller and the follow-up roller are connected with a motor reducer; and the motor reducer is connected with the lower cross beam of the bearing unit.

The objective carrying platform unit comprises a battery drive mechanism which is arranged on the objective carrying platform. Seen from downside to upside in turn beginning the objective carrying platform adopted as a reference surface, the battery drive mechanism comprises a horizontal rotary mechanism which is fixed on the objective carrying platform; the battery drive mechanism further comprises a tilting included angle adjusting mechanism and the battery pushing mechanism which are arranged on the horizontal rotary mechanism in turn. A support cross beam is arranged on the battery pushing mechanism, and the support cross beam is connected with a battery tray.

The battery pushing mechanism comprises a guide rail, a drive motor of the battery pushing mechanism, and an electromagnetic pushing hand. The drive motor of the battery pushing mechanism is connected with the electromagnetic push hand through respective gear rack mechanisms. Two circular electromagnetic suction discs are installed on the pushing-hand working surface of the electromagnetic pushing hand and distributed on the two ends of the working surface; and the positions are relative to two circular irons on the inner battery box. The pushing-hand working surface of the electromagnetic pushing hand is further provided with an unlocking mechanism which is matched with a locking mechanism on the inner battery box. The guide rail is arranged on the upper surface of the battery pushing mechanism.

The position of the guide rail is matched with the position of the inner battery box, and the inner battery box is a box body in which the batteries arranged in groups. The inner battery box is located a charging rack or a vehicle, so that the batteries can be stably fetched.

The two ends of the support cross beam are respectively provided with at least one ultrasonic distance measuring sensor and at least one pressure sensor; and the pressure sensor is located at the inner side of the ultrasonic distance measuring sensor.

The horizontal rotary mechanism comprises a connection rod-sliding block mechanism which is installed on the objective carrying platform, a rotary bottom plate I, and a bottom plate II. The battery drive mechanism horizontally rotates around the centre of the rotary bottom plate I.

The tilting included angle adjusting mechanism comprises a gear arched rack device which is installed on one end of the objective carrying platform, and a tilting drive motor which is matched and connected with the tilting included angle adjusting mechanism. The tilting included angle adjusting mechanism is provided with a tilting rotary shaft, the tilting rotary shaft is installed on the rotary bottom plate I, and the battery drive mechanism implements the tilting operation around the tilting rotary shaft.

The main control computer system comprises an industrial personal computer I and a PLC (Programmable Logic Controller) controller. The PLC controller is connected with the industrial personal computer I in communication through an industrial Ethernet. The type of the PLC controller is Siemens PLC 300.

The data collection device comprises an ultrasonic sensor I, photoelectric sensors, a color mark sensor and a DMP position sensor. The ultrasonic sensor I, the color mark sensor and the DMP position sensor are installed on the electromagnetic pushing hand. The photoelectric sensors are installed on the upper cross beam and the vertical columns and used for positioning in the X-axis and the Y-axis direction of the robot.

The power drive mechanism comprises servo drivers of six motors. The servo drivers of six motors are respectively connected with the servo drivers in the horizontal moving unit, the objective carry platform unit and the bearing unit and the servo drivers in the horizontal rotary mechanism, the tilting included angel adjusting mechanism and the locking device. A coder is arranged on the shaft of each servo driver, and the signal output ends of the coders are connected with the PLC controller.

The I/O model comprises an emergency stop switch I and limiting switches, which are respectively connected with the PLC controller. The limiting switches are respectively arranged on the working zero positioning parts of the horizontal moving unit, the objective carrying platform unit and the bearing unit, and connected with the corresponding servo drivers by a manner of contacting.

The main robot control platform comprises a cabinet body; an industrial personal computer II is installed on the inner bottom part of the cabinet body, the upper half part of the face of the cabinet body is provided with a resistive touch screen, the wireless communication model II is installed on the back surface of the cabinet body, an operation state indicating lamp and an emergency stop button are installed at the lower side of the touch screen on the cabinet body, the resistive touch screen and the wireless communication model II are connected with the industrial personal computer II, and the operation state indicating lamp and an emergency stop button are connected with the industrial personal computer II through a level conversion circuit board;

The back surface of the cabinet is provided with a cabinet body door, and a rain-roof lock is arranged on the cabinet body door;

The industrial personal computers are connected with the resistive touch screen through a VGA (Video Graphics Array) interface;

The wireless communication model II communicates with the industrial personal computer II through an internet access;

The wireless communication model II and the wireless communication model I adopt an IEEE 802.11 standard wireless network of WiFi or a CDMA (Code Division Multiple Access) model or an EDGE (Enhanced Data Rate for GSM Evolution) model.

The robot system further comprises a robot wireless remote control device. The robot wireless remote control device comprises a shell. The shell is provided with a main switch, two two-dimensional rocking bars, a starting button, a stopping button and a servo electrifying button. A main control plate and a wireless communication model III for transmitting the handing data, the head data, the tail data and the corrosion data are arranged in the shell. The main switch, the two two-dimensional rocking bars, the starting button, the stopping button, the servo electrifying button and the wireless communication model III are connected with the main control plate. The main control plate switches the direction information of the two-dimensional rocking bars into the electric signals and controls the movement of the current alternating robot through the receiving and sending commands of the wireless communication model III. The shell is provided with a state indicating lamp; and the state indicating lamp is connected with the main control plate. The shell is provided with an emergency stop button III; and the emergency stop button III is connected with the main control plate. The shell is provided with a spare button. The principal computer is provided with the wireless communication model I; and the wireless communication model I, the wireless communication model II of a control backend and the wireless communication model III in the remote control device wirelessly communicate with each other.

The current alternating method comprises the following steps:

1) initializing, which is to send reset commands through the main control computer system or the main robot control platform or the wireless remote control device after the system is electrified, search zero after each shaft of the robot triggers the limiting switch, and return each shaft to the original position;

2) detaching the batteries, which is to move the current alternating robot to the appointed position through the main control computer system or the main robot control platform or the wireless remote control device according to the stored information of the coordinate points after the vehicles safely stop in the appointed current alternating areas, adjust the gesture of the battery tray according to the signals of the DMP position sensor and the ultrasonic sensor I, accurately stretch the battery tray on the position which is aligned to or butted with the battery cabin of the vehicle body, send the rotary angle position signals of the horizontal rotary mechanism and the titling included adjusting mechanism to the PLC controller and store the signals, adopt the unlocking motor to drive the unlocking mechanism to unlock, judge and determine whether the unlocking operation is finished according to the feedback signals of the color mark sensor, and after the unlocking operation is successful, adopt the electromagnetic suction discs arranged on the electromagnetic pushing hand in the objective carrying platform to take the batteries outside the battery cabin of the vehicle body;

3) obtaining and putting the batteries, which is to adopt the PLC controller to control the robot to move on the working point appointed by a battery carrying platform according to the stored coordinate points and the photoelectric sensor, put the taken drained batteries on the transit table, and take down the charged batteries on the other transit table;

4) installing the batteries, which is to adopt the PLC controller to control the robot to move on the position of the battery cabin of the vehicle body, adjust the gesture of the battery tray according to the rotary angles of the horizontal rotary mechanism and the tilting included angle adjusting mechanism, install the batteries in the battery cabin, unlock the batteries by a manner of driving the unlocking mechanism through the unlocking motor on the electromagnetic pushing hand, judge and determine that the unlocking operation is finished according to the detection signals of the color mark sensor, adopt the PLC controller to control the electromagnetic suction discs to lose power, separate the electromagnetic suction discs from the batteries, retract and fix the electromagnetic pushing hand along the objective carrying platform, and finish the current alternating operation of the batteries in the single boxes;

5) repeating the processes 2), 3) and 4) until that all the drained batteries are changed and the robot returns to the original point for standby.

The invention adopts the current alternating robot to exchange the power batteries between the transit table and the electric bus, so that the work for quickly changing the power batteries can be finished. The invention is symmetrically distributed at the two sides of the electric bus to be charged, so that the invention is suitable for changing the power batteries arranged at the two sides of the electric bus at the same time.

The invention has the following beneficial effects: because of the application of the current alternating robot, the space occupancy rate of the working area is reduced, and the utilization rate of the land sources is effectively improved; and the current alternating robot can adjust the gestures according to the battery positions of the power bus and can automatically distinguish and quickly, accurately and safely change the batteries of the electric bus, so the positioning precision during the current alternating process is high, the relative displacement is small, the position is accuracy, and the power batteries of the different kinds of the electric bus can be quickly changed.

Wherein 101 is representative for the upper cross beam, 102 is representative for the sky rail, 103 is representative for the vertical columns, 104 is representative for the lower cross beam, 105 is representative for the ground rack, 106 is representative for the limiting collision block, 107 is representative for the horizontal moving unit, 108 is representative for the objective carrying platform, 109 is representative for the battery drive mechanism, 110 is representative for the electromagnetic pushing hand, 111 is representative for the longitudinal guide wheels, 112 is representative for the horizontal guide wheels, 113 is representative for the unlocking mechanism, 114 is representative for the electromagnetic suction discs, 201 is representative for the inner battery box, 202 is representative for the pressure sensors, 204 is representative for the guide rail, 205 is representative for the ultrasonic distance measuring sensor, 206 is representative for the tilting included angle adjusting mechanism, 207 is representative for the battery pushing mechanism, 208 is representative for the drive motor of the battery pushing mechanism, 210 is representative for the horizontal rotary mechanism, 211 is representative for the support cross beam, 301 is representative for the tilting rotary shaft, 302 is representative for the arched rack, 303 is representative for the included drive motor, 401 is representative for the rotary bottom plate I, 402 is representative for the bottom plate II, 403 is representative for the horizontal rotary shaft, 404 is representative for the horizontal drive motor, 405 is representative for a screw rod, 406 is representative for a screw rod nut, 407 is representative for a connection rod, 501 is representative for the main control computer system, 502 is representative for the PLC controller, 503 is representative for the limiting switch, 504 is representative for the drive motors of a linear operation unit of which the free degree is 6, 505 is representative for the servo drivers of the six motors, 506 is representative for the motor coder, 507 is representative for the emergency stop switch I, 508 is representative for the ultrasonic sensor I, 509 is representative for the color mark sensor, 510 is representative for the photoelectric sensors, 511 is representative for the DMP position sensor, 512 is representative for the wireless communication model I, 513 is representative for the wireless communication model II, and 514 is representative for the wireless communication model III.

Concrete Implementing Method

The invention is further explained by a manner of combining the appended figures with the embodiment.

Figure 1:
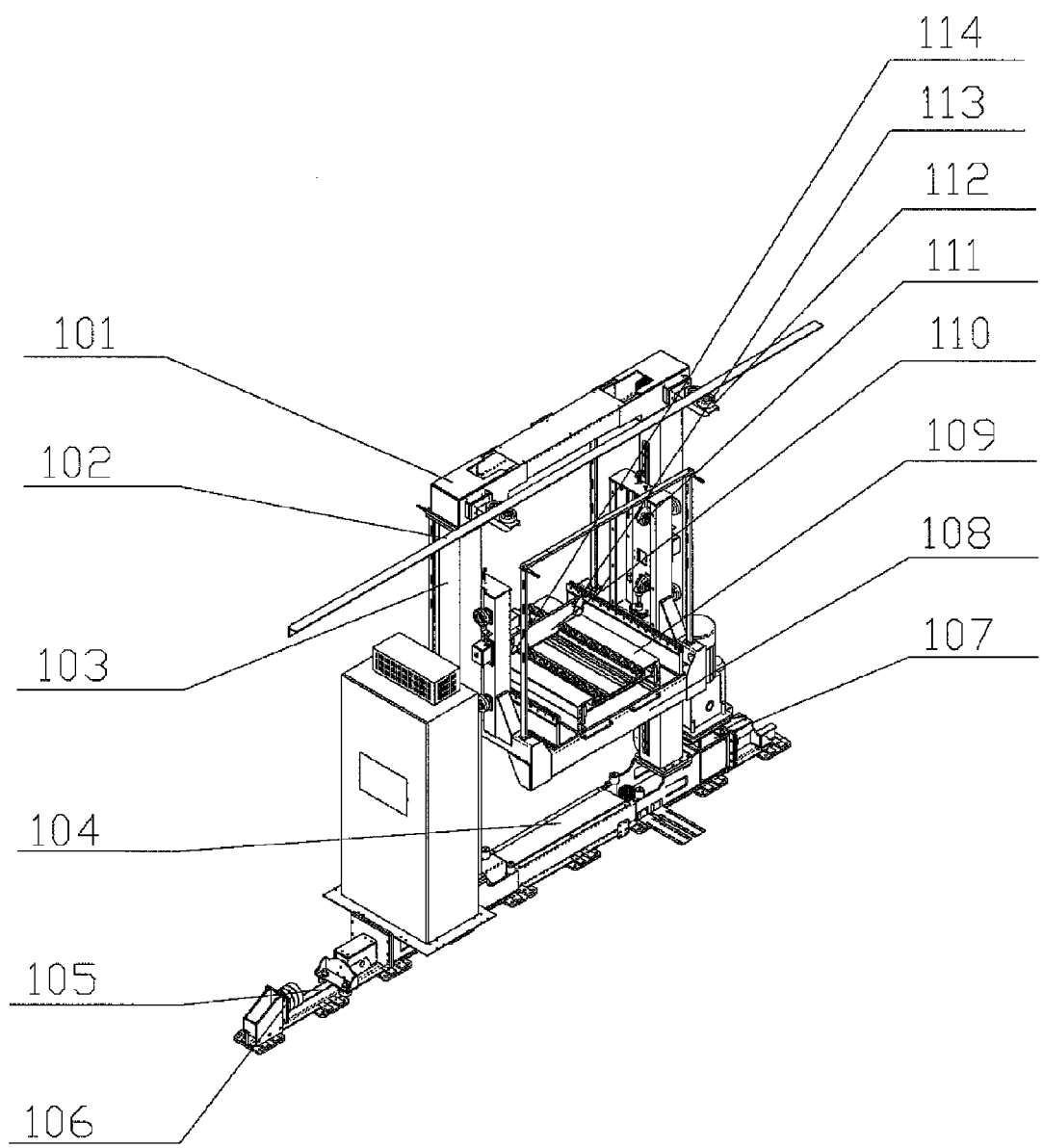
FIG. 1 is the current alternating robot sketch of the invention.
Figure 2:
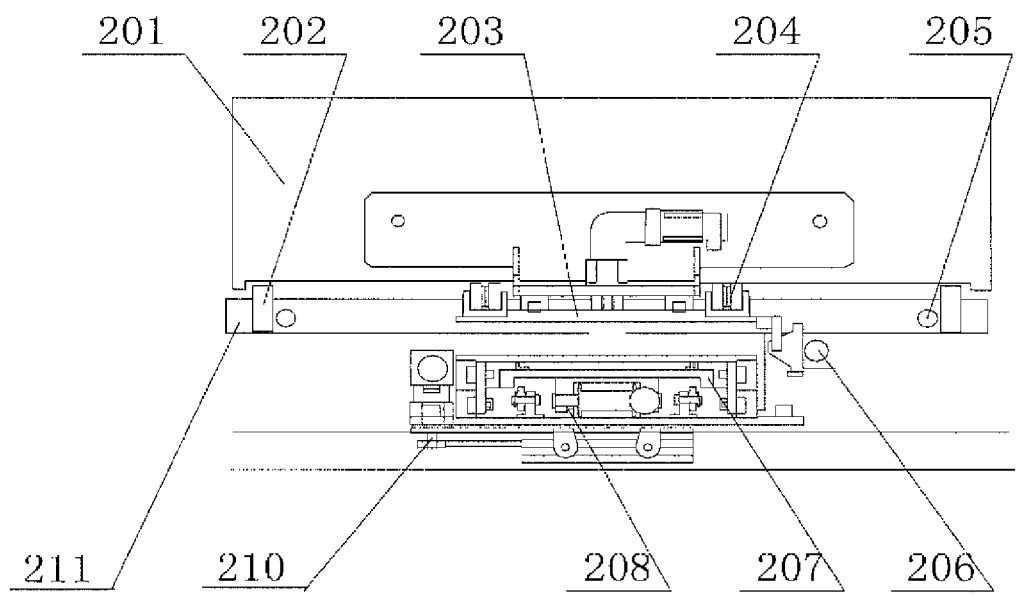
FIG. 2 is the back vision structural sketch of the objective carrying platform unit of the current alternating robot of the invention.

The FIG. 1 and the FIG. 2 are representative for the current alternating robot sketch and the back vision structural sketch of the objective carrying platform unit of the invention. In the figures, the horizontal moving unit 107, the objective carrying unit and the bearing unit of the mechanical part of the system establish the three-coordinate main body structure of the system. The horizontal moving unit 107 comprises the roller and the follow-up roller of which two sides are provided with rims, and the ground rack 105 which is connected with the lower cross beam 104 of the bearing unit. The end part of the ground rack 105 is provided with the limiting collision block 106. The roller and the follow-up roller are connected with the motor reducer; and the motor reducer is connected with the lower cross beam 104 of the bearing unit. The bearing unit is arranged on the upper part of the horizontal moving unit 107, and the objective carrying platform unit is connected with the bearing unit. The objective carrying platform unit comprises the objective carrying platform 108 and the battery drive mechanism 109 arranged on the objective carrying platform. The battery pushing mechanism 207 is arranged on the battery drive mechanism 109.

The electrical control part comprises the data collection device connected with the main control computer system 501, the power drive mechanism, the I/O model and the wireless communication model I 512. The power drive mechanism is connected with the horizontal moving unit 107 and the bearing unit in the mechanical part and the transmission device in the objective carrying platform.

The bearing unit comprises the gate structure which consists of the upper cross beam 101, the lower cross beam 104 and the two vertical columns 103. The two groups of the horizontal guide wheels 112 are arranged on the upper cross beam 101; and the sky rail 102 which is installed on the charge rack is held between the two groups of the horizontal guide wheels 112. The slide-touch wire channel through which the equipment gets electricity and the horizontal addressing chip for addressing the working positions in horizontal direction are installed on the sky rail 102. The winches driven by at least one group of the motors are arranged on one lateral vertical column 103 of the two vertical columns 103. The steel wire ropes are wound on the winches, and the lower ends of the steel wire ropes are connected on the objective carrying platform unit. The longitudinal addressing chip for addressing in vertical direction is arranged on at least one vertical column. The two ends of the objective carrying platform 108 are provided with brackets, multiple groups of the longitudinal guide wheels 111 are arranged on the brackets, and the multiple groups of the longitudinal guide wheels 111 are respectively distributed along the two vertical columns of the bearing unit.

The objective carrying platform unit comprises the battery drive mechanism 109 which is arranged on the objective carrying platform 108. Seen from downside to upside in turn beginning the objective carrying platform 108 adopted as the reference surface, the battery drive mechanism comprises the horizontal rotary mechanism 210 which is fixed on the objective carrying platform; and the battery drive mechanism further comprises the tilting included angle adjusting mechanism 206 and the battery pushing mechanism 207 which are arranged on the horizontal rotary mechanism in turn. The support cross beam 211 is arranged on the battery pushing mechanism 207, and the support cross beam is connected with the battery tray.

The battery pushing mechanism 207 comprises the guide rail 204, the drive motor 208 of the battery pushing mechanism, and the electromagnetic pushing hand 110. The drive motor 208 of the battery pushing mechanism is connected with the electromagnetic push hand 110 through respective gear rack mechanisms. The two circular electromagnetic suction discs 114 are installed on the pushing-hand working surface of the electromagnetic pushing hand 110 and distributed on the two ends of the working surface; and the positions are relative to two circular irons on the inner battery box. The pushing-hand working surface of the electromagnetic pushing hand 110 is further provided with the unlocking mechanism 113 which is matched with the locking mechanism on the inner battery box. The inner battery box is a box body in which the batteries are arranged in groups. The guide rail 204 is arranged on the upper surface of the battery pushing mechanism 207.

The unlocking mechanism 113 which is a shifting fork shape of the unlocking motor is arranged and distributed on the two ends of the working surface of the electromagnetic pushing hand 110 and used for opening the charging rack or the locking device arranged on the inner battery box of the current alternating vehicle.

The guide rail 204 which is corresponded to the inner battery box 201 is arranged on the upper plane of the battery pushing mechanism 207; and the inner battery box 201 is located on the charging rack or the vehicle, so that the batteries can be stably fetched.

The two ends of the support cross beam 211 are respectively provided with one ultrasonic distance measuring sensor 205 and one pressure sensor 202; and the pressure sensors which are respectively arranged on the two ends of the support cross beam 211 are located at the inner side of the ultrasonic distance measuring sensor 205.

Figure 3:
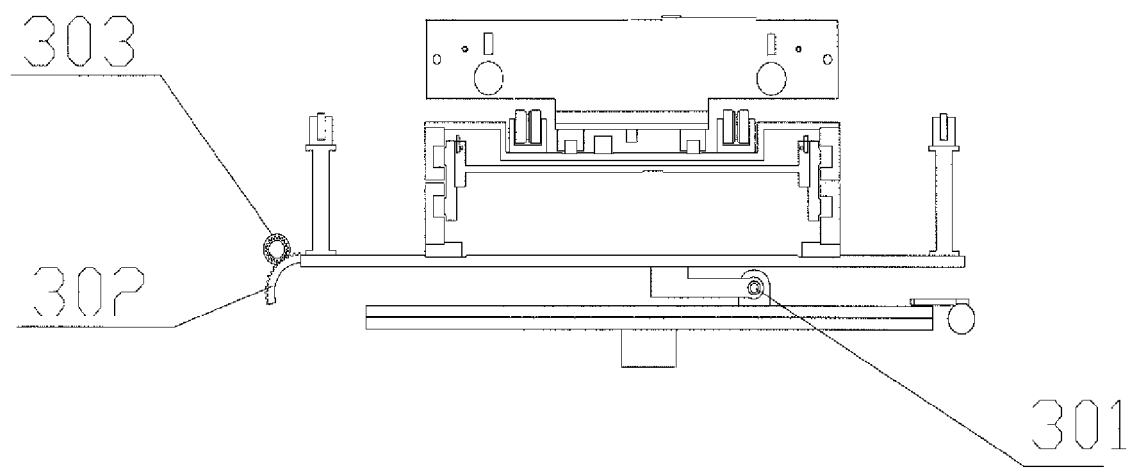
FIG. 3 is the front view sketch of the tilting included angle adjusting mechanism of the objective carrying platform unit of the invention.

In the FIG. 3, the front view sketch of the tilting included angle adjusting mechanism of the objective carrying platform unit of the invention, the tilting included angle adjusting mechanism 206 comprises the gear arched rack device which is installed on the left end of the objective carrying platform 108. The tilting drive motor 303 drives the gear to rotate; and the gear and the arched rack are meshed with each other, and the arched rack 302 drives the bottom plate to rotate around the tilting rotary shaft 301 so as to realize the tilting motion. The tilting rotary shaft is installed on the rotary bottom plate I 401.

Figure 4A:
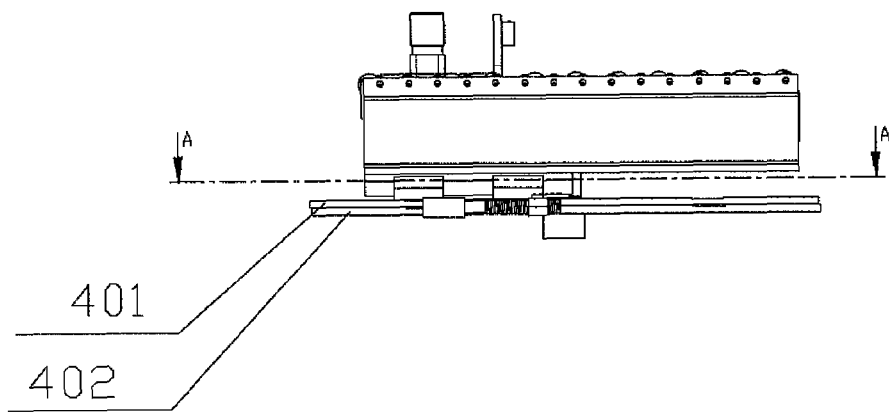
FIG. 4A is the horizontal rotary mechanism sketch of the objective carrying platform unit of the invention.
Figure 4B:
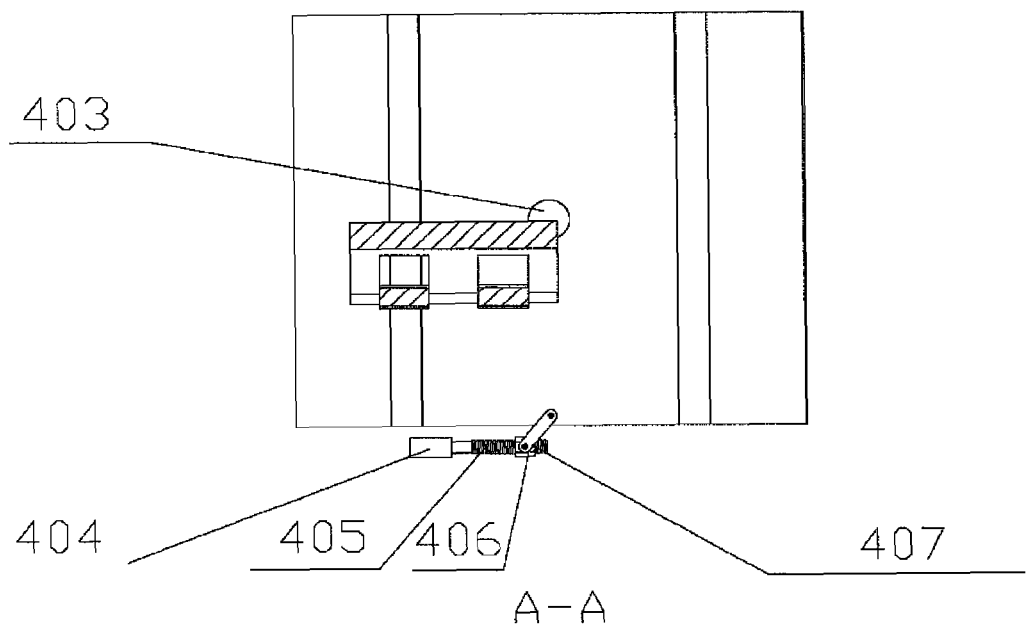
FIG. 4B is the horizontal rotary mechanism A-A sketch of the objective carrying platform unit of the invention.

In the FIG. 4A and the FIG. 4B, the horizontal rotary mechanism 210 comprises the connection rod-sliding block mechanism which is installed on the objective carrying platform 108. The horizontal drive motor 404 is adopted to drive the screw rod 405 to rotate, the screw rod 405 is adopted to drive the screw rod nut 406 to horizontally move along a beeline, the screw rod nut 406 is connected with the connection rod 407 by a manner of hinging, the connection rod 407 is connected with the rotary bottom plate I 401 by the manner of the hinging, and the rotary bottom plate I 401 and the bottom plate II 402 which is installed on the objective carrying platform 108 are overlapped through the horizontal rotary shaft 403. When the connection rod 407 moves driven by the screw rod nut 406, the connection rod 407 drives the rotary bottom plate I 401 to horizontally rotate around the horizontal rotary shaft 403.

Figure 5:
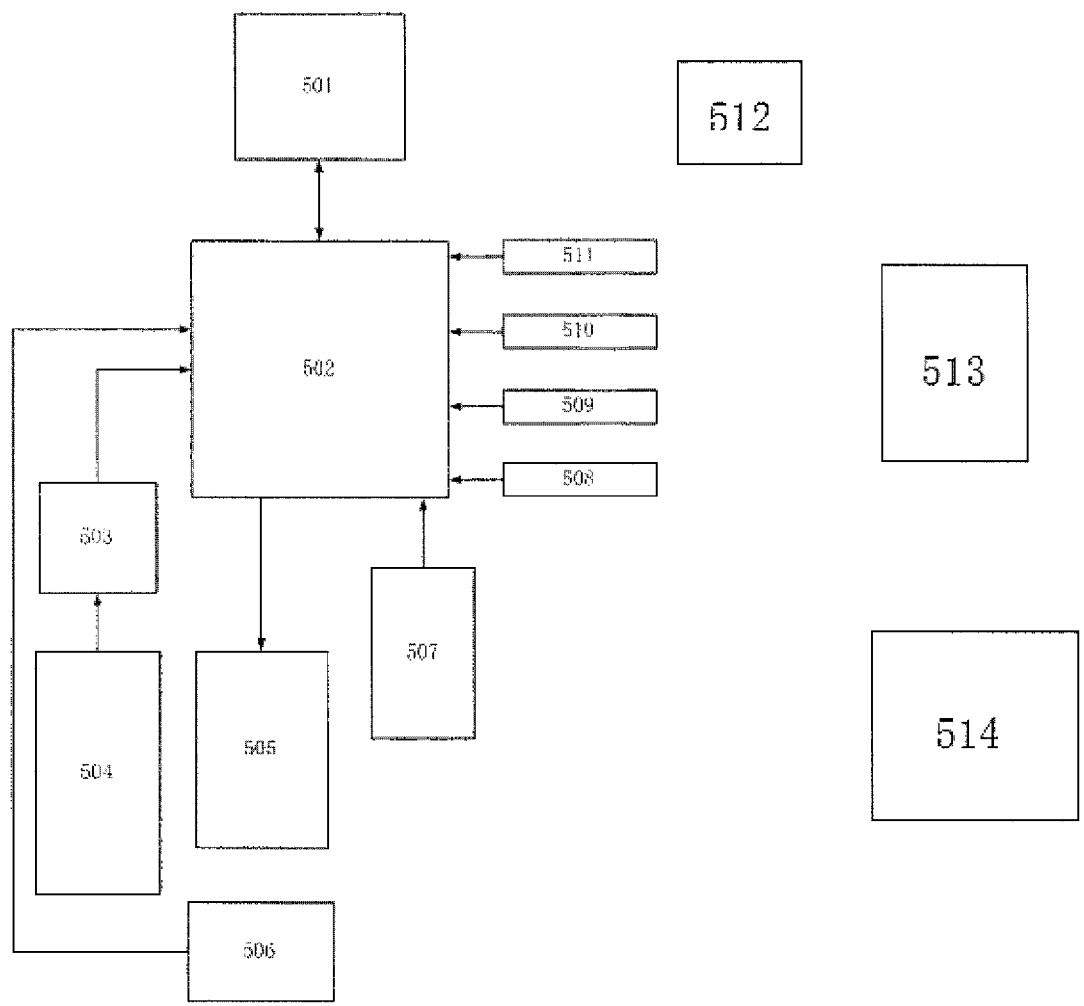
FIG. 5 is the control system sketch of the current alternating robot.

In the FIG. 5, the robot body system comprises the main control computer system 501, the PLC controller 502, the limiting switch 503, the drive motors 504 of the linear operation unit of which the free degree is 6, the servo drivers 505 of the six motors, the motor coder 506, the emergency stop switch I 507, the ultrasonic sensor I 508, the color mark sensor 509, the photoelectric sensors 510 and the DMP position sensor 511, wherein the main control computer system 501 comprises a displayer, a mouse, a keyboard, a host and a software system; the host adopts the industrial personal computer in X86 series and the windows XP operation system; the main control computer system is developed by using Visual C++; the software realizes the multi-thread transaction, so that the operators can adopt the mouse and the keyboard to operate the main control computer;

the Siemens PLC 300 logic controller is the core component for controlling the complete system, which is to control the corresponding drive motor by a manner of communicating the industrial Ethernet with the main control computer system 501 and synthetically judging the signals of the ultrasonic sensor I 508, the color mark sensor 509, the photoelectric sensors 510 and the DMP position sensor 511.

The data collection device comprises the ultrasonic sensor I 508, the photoelectric sensors 510, the color mark sensor 509 and the DMP position sensor 511.

The ultrasonic sensor I 508, the color mark sensor 509 and the DMP position sensor 511 are installed on the electromagnetic pushing hand. The photoelectric sensors 510 are installed on the upper cross beam 101 and the vertical columns 103 and used for positioning in the X-axis and the Y-axis direction of the robot.

The limiting switch 503 is used for the reference mechanical zero point of each motion shaft. Each servo driver 505 can monitor the current of the corresponding motor and the motor rotation blockage or can alarm to the controller when the rated load is exceeded. When the system has failures, the motion control system can autonomously judge and treat the states of the failures, and can report the content of the failures to the monitoring system of the principal computer. The emergency stop switch I 507 is used for stopping the device in emergency under the emergency situations during the operation, and the priority is the first one.

After the vehicles safely stop in the appointed current alternating area, the current alternating robot dynamically adjusts and obliquely drives 206 according to the stored coordinate points and the signals of the DMP position sensor 511 and the ultrasonic sensor I 508, and then accurately stretches the battery tray on the position which is aligned to the position of the battery cabin of the vehicle body; at the same time, the rotary angle position signals of the titling included angle adjusting mechanism and the horizontal rotary mechanism are sent to and stored in the PLC controller; the unlocking motor drives the unlocking mechanism 113 to unlock the battery box until that the unlocking operation is finished according to the feedback signals of the color mark sensor 509; later the electromagnetic pushing hand 110 which is provided with the electromagnetic suction discs in the Y-axes direction is electrified, the electromagnetic suction discs produce the electromagnetic suction force, and then the batteries are taken outside the battery cabin of the vehicle body. The PLC controller controls the robot move to the transit table according to stored coordinate points and the signals of the photoelectric sensors 510 which are located in the X-axes and Z-axes directions, and the transit table is the charging rack of the batteries in charging stations; the taken drained batteries to be charged are put on the transit table, and the batteries which are charged on the other transit table are taken down. The PLC controllers controls the robot to move on the position of the battery cabin of the vehicle body, and then the 206 and the horizontal rotary mechanism 210 are adjusted and obliquely driven according to the rotary angle value of the stored tilting included angle adjusting mechanism and the horizontal rotary mechanism so as to adjust the gesture of the battery tray and finally install the batteries in the battery cabin; the unlocking motor drives the unlocking mechanism 113 to lock the battery, whether the locking operation is finished is judged and determined according to the color mark sensor 509, if so, the PLC controller controls the electromagnetic suction discs 114 to lose the power, later the electromagnetic suction discs 114 is separated from the battery cabin and retracted in the Y-axes direction, and then the current alternating operation of the batteries in the single boxes is finished; and the change process of the batteries in the first box is repeated until that all the batteries are changed, and then the robot returns to the original point for standby.

The two sides of the roller and the follow-up roller are provided with the rims. The rims hold the ground rack 105 so as to prevent the ejection. The roller moves on the ground rack, and the follow-up roller linearly moves along the ground rack 105.

The electromagnetic pushing hand 110 is installed on the battery pushing mechanism 207, the battery pushing mechanism 207 drives the electromagnetic pushing hand 110 to stretch or retract the power batteries. At the same time, when the battery drive mechanism 109 on the current alternating robot is retracted, the horizontal movement of the current alternating robot and the vertical movement of the objective carrying platform 108 are allowed, and the purpose is to prevent the collision caused by error operations.

The battery pushing mechanism 207 is arranged on the tilting included angle adjusting mechanism 206, and comprises the guide rail 204, the electromagnetic suction discs 114 and the unlocking mechanism 113. The batteries are supported by using the guide rail 204, at the same time, the batteries are sucked by using the electromagnetic suction discs 114, and the power batteries are pushed on the appointed position by using the battery pushing mechanism 207.

The pressure sensors 202 are arranged and distributed at the two sides of the support cross beam 211, at the same time, and the ultrasonic distance measuring sensor 205 is arranged at the inner side of the pressure sensors 202;

the battery drive mechanism of the current alternating robot comprises the support cross beam 211, the tilting drive motor 303, the horizontal rotary mechanism 210 and the battery pushing mechanism 207. The battery pushing mechanism 207 is driven by the drive motor 208 of the battery pushing mechanism. The electromagnetic pushing hand 110 is corresponded to the inner battery box 201.

A two-shaft rotary mechanism is installed the bearing platform 108 to realize the gesture adjustment when the batteries of the electric bus are fetched; the direction deviation (horizontal included angle) is adjusted when the bus enters the station to alternate the current; and the included angle (the titling included angle) between the battery in the vehicle and the ground is automatically adapted.

The structure of the electromagnetic pushing hand 110 is similar to the structure of the electromagnetic pushing hand 110 on a stocker; the two ultrasonic distance measuring sensors (for measuring the horizontal included angle), the two pressure sensors 202 and the photoelectric sensors 510 are adhered on reflectors which are installed on the outer battery box of the bus so as to measure the titling included angle; and the follow-up function can be realized when the height of the vehicle body is changed during the process of fetching the batteries in the bus.

The current alternating robot puts the batteries on the transit table, specifically, the movements of the current alternating robot in the horizontal direction or vertical direction are aligned to the charging rack in the transit table so as to stretch the battery pushing mechanism 207, at the same time, the inner battery box in which the power batteries are arranged are put in the transit table, and the unlocking mechanism 113 acts to lock the power battery on the transit table. The electromagnetic pushing hand 110 is separated from the batteries, the battery pushing mechanism 207 is withdrawn after the objectively carrying platform 108 descends to a certain height, and finally the procedure of putting the batteries is finished. The method for fetching the power batteries by the current alternating robot from the transit table comprises the following steps: the current alternating robot aligns to the power batteries on the transit table, the battery pushing mechanism 207 is stretched, and the electromagnetic suction discs 114 on the electromagnetic pushing hand 110 suck the batteries; at the same time, the unlocking mechanism 113 acts to unlock the power battery lock, and the power batteries are pulled outside; and at the same time, the battery pushing mechanism 207 is withdrawn, and the procedure of taking the batteries from the transit table is finished.

The I/O model comprises the emergency stop switch I and the limiting switches, which are respectively connected with the PLC controller. The limiting switches are respectively arranged on the working zero positioning parts of the horizontal moving unit, the objective carrying platform unit and the bearing unit, and connected with the corresponding servo drivers by a manner of contacting.

The main robot control platform comprises the cabinet body; the industrial personal computer II is installed on the inner bottom part of the cabinet body, the upper half part of the face of the cabinet body is provided with the resistive touch screen, the wireless communication model II is installed on the back surface of the cabinet body, the operation state indicating lamp and the emergency stop button are installed at the lower side of the touch screen on the cabinet body, the resistive touch screen and the wireless communication model II are connected with the industrial personal computer II, and the operation state indicating lamp and an emergency stop button are connected with the industrial personal computer II through the level conversion circuit board;

The back surface of the cabinet is provided with the cabinet body door, and the rain-roof lock is arranged on the cabinet body door;

The industrial personal computers are connected with the resistive touch screen through the VGA (Video Graphics Array) interface;

The wireless communication model II communicates with the industrial personal computer II through an internet access;

The wireless communication model II and the wireless communication model I adopt an IEEE 802.11 standard wireless network of WiFi or a CDMA (Code Division Multiple Access) model or an EDGE (Enhanced Data Rate for GSM Evolution) model.

The robot system further comprises the robot wireless remote control device. The robot wireless remote control device comprises the shell. The shell is provided with the main switch, two two-dimensional rocking bars, the starting button, the stopping button and the servo electrifying button. The main control plate and the wireless communication model III for transmitting the handing data, the head data, the tail data and the corrosion data are arranged in the shell. The main switch, the two two-dimensional rocking bars, the starting button, the stopping button, the servo electrifying button and the wireless communication model III are connected with the main control plate. The main control plate switches the direction information of the two-dimensional rocking bars into the electric signals and controls the movement of the current alternating robot through the receiving and sending commands of the wireless communication model III. The shell is provided with the state indicating lamp; and the state indicating lamp is connected with the main control plate. The shell is provided with the emergency stop button III; and the emergency stop button III is connected with the main control plate. The shell is provided with the spare button. The principal computer is provided with the wireless communication model I; and the wireless communication model I wirelessly communicates with the wireless communication model II of the control backend and the wireless communication model III in the remote control device.

The current alternating method comprises the following steps:

1) initializing, which is to send reset commands through the main control computer system 501 or the main robot control platform or the wireless remote control device, search zero after each shaft of the robot triggers the limiting switch 503 and return each shaft to the original position;

2) detaching the batteries, which is to move the current alternating robot to the appointed position through the main control computer system 501 or the main robot control platform or the wireless remote control device according to the stored information of the coordinate points after the vehicles safely stop in the appointed current alternating areas, adjust the gesture of the battery tray according to the signals of the DMP position sensor and the ultrasonic sensor I 508, accurately stretch the battery tray on the position which is aligned to or butted with the battery cabin of the vehicle body, send the rotary angle position signals of the horizontal rotary mechanism 210 and the titling included adjusting mechanism 206 to the PLC controller and store the signals, adopt the unlocking motor to drive the unlocking mechanism to unlock, judge and determine whether the unlocking operation is finished according to the feedback signals of the color mark sensor 509, and after the unlocking operation is successful, adopt the electromagnetic suction discs arranged on the electromagnetic pushing hand in the objective carrying platform to take the batteries outside the battery cabin of the vehicle body;

3) putting and taking down the batteries, which is to adopt the PLC controller to control the robot to move on the working point appointed by the battery carrying platform 108 according to the stored coordinate points and the photoelectric switch signals of the horizontal moving unit 107 and the objective carrying platform unit, put the taken drained batteries on the transit table, and take down the charged batteries on the other transit table;

4) installing the batteries, which is to adopt the PLC controller to control the robot to move on the position of the battery cabin of the vehicle body, adjust the gesture of the battery tray according to the rotary angles of the horizontal rotary mechanism 210 and the tilting included angle adjusting mechanism 206, install the batteries in the battery cabin, unlock the batteries by a manner of driving the unlocking mechanism through the unlocking motor on the electromagnetic pushing hand, judge and determine that the unlocking operation is finished according to the detection signals of the color mark sensor 509, adopt the PLC controller to control the electromagnetic suction discs to lose power, separate the electromagnetic suction discs from the batteries, retract and fix the electromagnetic pushing hand along the objective carrying platform, and finish the current alternating operation of the batteries in the single boxes;

5) repeating the processes 2), 3) and 4) until that all the drained batteries are changed and the robot returns to the original point for standby.

Though the concrete implementation method of the invention is descried by combining the figures, the protection range of the invention is not limited. The technical personnel of the field shall understand that based on the technical field of the invention, various modifications or deformations made by the technical personnel without creative labor are in the protection range of the invention.

The invention claimed is:

1. A current alternating robot system of an electric bus comprises a robot body and a main robot control platform, wherein the robot body comprises a mechanical part and an electrical control part; the mechanical part comprises a horizontal moving unit, an objective carrying platform unit and a bearing unit which are arranged in X, Y and Z cartesian coordinate directions; the bearing unit is on the upper part of the horizontal moving unit, and the objective carrying platform unit is connected with the bearing unit; the objective carrying platform unit comprises an objective carrying platform and a battery drive mechanism arranged on the objective carrying platform; a battery pushing mechanism is arranged on the battery drive mechanism;

the electrical control part comprises a data collection device connected with a main control computer system, a power drive mechanism, an I/O model and a wireless communication model I; the power drive mechanism is connected with the horizontal moving unit and the bearing unit in the mechanical part and a transmission device in the objective carrying platform;

and the main control platform of the robot establishes the wireless communication with the wireless communication model I of the robot body through a wireless communication model II, wherein the bearing unit comprises a gate structure which consists of an upper cross beam, a lower cross beam and two vertical columns; two groups of horizontal guide wheels are arranged on the upper cross beam; a sky rail which is installed on a charge rack is held between the two groups of the horizontal guide wheels; a slide-touch wire channel through which equipment gets electricity and a horizontal addressing chip for addressing the working positions in horizontal direction are installed on the sky rail; winches driven by at least one group of motors are arranged on the two vertical columns; steel wire ropes are wound on the winches, and the lower ends of the steel wire ropes are connected on the objective carrying platform unit; and a longitudinal addressing chip for addressing in vertical direction is arranged on at least one vertical column.

2. A current alternating robot system of an electric bus comprises a robot body and a main robot control platform, wherein the robot body comprises a mechanical part and an electrical the mechanical part comprises a horizontal moving unit, an objective carrying platform unit and a bearing unit which are arranged in X, Y and Z cartesian coordinate directions; the bearing unit is arranged on the upper part of the horizontal moving unit, and the objective carrying platform unit is connected with the bearing unit; the objective carrying platform unit comprises an objective carrying platform and a battery drive mechanism arranged on the objective carrying platform; a battery pushing mechanism is arranged on the battery drive mechanism;

the electrical control part comprises a data collection device connected with a main control computer system, a power drive mechanism, an I/O model and a wireless communication model I; the power drive mechanism is connected with the horizontal moving unit and the bearing unit in the mechanical part and a transmission device in the objective carrying platform;

and the main control platform of the robot establishes the wireless communication with the wireless communication model I of the robot body through a wireless communication model II, wherein the objective carrying platform unit comprises a battery drive mechanism which is arranged on the objective carrying platform; seen from downside to upside in turn beginning the objective carrying platform adopted as a reference surface, the battery drive mechanism comprises a horizontal rotary mechanism which is fixed on the objective carrying platform; the battery drive mechanism further comprises a tilting included angle adjusting mechanism and the battery pushing mechanism which are arranged on the horizontal rotary mechanism in turn; a support cross beam is arranged on the battery pushing mechanism, and the support cross beam is connected with a battery tray;

the battery pushing mechanism comprises a guide rail, a drive motor of the battery pushing mechanism, and an electromagnetic pushing hand; the drive motor of the battery pushing mechanism is connected with the electromagnetic push hand through respective gear rack mechanisms; two circular electromagnetic suction discs are installed on the pushing-hand working surface of the electromagnetic pushing hand and distributed on the two ends of the working surface, and the positions are relative to two circular irons on the inner battery box; the pushing-hand working surface of the electromagnetic pushing hand is further provided with an unlocking mechanism which is matched with a locking mechanism on the inner battery box; the guide rail is arranged on the upper surface of the battery pushing mechanism;

the position of the guide rail is matched with the position of the inner battery box, and the inner battery box is a box body in which the batteries arranged in groups; the inner battery box is located a charging rack or a vehicle, so that the batteries can be stably fetched;

the two ends of the support cross beam are respectively provided with at least one ultrasonic distance measuring sensor and at least one pressure sensor; the pressure sensor is located at the inner side of the ultrasonic distance measuring sensor;

the horizontal rotary mechanism comprises a connection rod-sliding block mechanism which is installed on the objective carrying platform, a rotary bottom plate I, and a bottom plate II; the rotary bottom plate I and the bottom plate II are overlapped through a horizontal rotary shaft which is vertical to the bottom plate II; the battery drive mechanism horizontally rotates around the centre of the rotary bottom plate I;

the tilting included angle adjusting mechanism comprises a gear arched rack device which is installed on one end of the objective carrying platform, and a tilting drive motor which is matched and connected with the tilting included angle adjusting mechanism; and the tilting included angle adjusting mechanism is provided with a tilting rotary shaft, and the tilting rotary shaft is installed on the rotary bottom plate I.

3. A current alternating robot system of an electric bus comprises a robot body and a main robot control platform, wherein the robot body comprises a mechanical part and an electrical control part; the mechanical part comprises a horizontal moving unit, an objective carrying platform unit and a bearing unit which are arranged in X, Y and Z cartesian coordinate directions; the bearing unit is arranged on the upper of the horizontal moving unit, and the objective carrying platform unit is connected with the bearing unit; the objective carrying platform unit comprises an objective carrying platform and a battery drive mechanism arranged on the objective carrying platform; a battery pushing mechanism is arranged on the battery drive mechanism;

the electrical control part comprises a data collection device connected with a main control computer system, a power drive mechanism, an I/O model and a wireless communication model I; the power drive mechanism is connected with the horizontal moving unit and the bearing unit in the mechanical part and a transmission device in the objective carrying platform;

and the main control platform of the robot establishes the wireless communication with the wireless communication model I of the robot body through a wireless communication model II, wherein the power drive mechanism comprises servo drivers of six motors; the servo drivers of six motors are respectively connected with the servo drivers in the horizontal moving unit, the objective carry platform unit and the bearing unit and the servo drivers in the horizontal rotary mechanism, the tilting included angle adjusting mechanism and a locking device; and a coder is arranged on a shaft of each servo driver, and the signal output ends of the coders are connected with a PLC controller.

4. The current alternating robot system of the electric bus according to claim 1, wherein the I/O model comprises an emergency stop switch I and limiting switches, which are respectively connected with the PLC controller; and the limiting switches are respectively arranged on the working zero positioning parts of the horizontal moving unit, the objective carrying platform unit and the bearing unit, and connected with the corresponding servo drivers by a manner of contacting.

5. The current alternating robot system of the electric bus according to claim 1, wherein the main robot control platform comprises a cabinet body; an industrial personal computer II is installed on the inner bottom part of the cabinet body, the upper half part of the face of the cabinet body is provided with a resistive touch screen, the wireless communication model II is installed on the back surface of the cabinet body, an operation state indicating lamp and an emergency stop button are installed at the lower side of the touch screen on the cabinet body, the resistive touch screen and the wireless communication model II are connected with the industrial personal computer II, and the operation state indicating lamp and an emergency stop button are connected with the industrial personal computer II through a level conversion circuit board;

the back surface of the cabinet is provided with a cabinet body door, and a rain-roof lock is arranged on the cabinet body door;

the industrial personal computers are connected with the resistive touch screen through a VGA (Video Graphics Array) interface;

the wireless communication model II communicates with the industrial personal computer II through an internet access;

and the wireless communication model II and the wireless communication model I adopt an IEEE 802.11 standard wireless network of WiFi or a CDMA (Code Division Multiple Access) model or an EDGE (Enhanced Data Rate for GSM Evolution) model.

6. The current alternating robot system of the electric bus according to claim 1, wherein the robot system further comprises a robot wireless remote control device; the robot wireless remote control device comprises a shell; the shell is provided with a main switch, two two-dimensional rocking bars, a starting button, a stopping button and a servo electrifying button; a main control plate and a wireless communication model III for transmitting the handing data, the head data, the tail data and the corrosion data are arranged in the shell; the main switch, the two two-dimensional rocking bars, the starting button, the stopping button, the servo electrifying button and the wireless communication model III are connected with the main control plate; the main control plate switches the direction information of the two-dimensional rocking bars into the electric signals and controls the movement of the current alternating robot through the receiving and sending commands of the wireless communication model III; the shell is provided with a state indicating lamp, and the state indicating lamp is connected with the main control plate; the shell is provided with an emergency stop button III, and the emergency stop button III is connected with the main control plate; the shell is provided with a spare button; the personal computer is provided with the wireless communication model I; and the wireless communication model I, the wireless communication model II of a control backend and the wireless communication model III in the remote control device wirelessly communicate with each other.

* * * * *